(12) United States Patent
Inami

(10) Patent No.: US 9,669,790 B2
(45) Date of Patent: Jun. 6, 2017

(54) ROOF HEADLINER STRUCTURE IN WHICH CURTAIN AIRBAG FOR VEHICLE IS HOUSED

(71) Applicant: TOYOTA BOSHOKU KABUSHIKI KAISHA, Aichi-ken (JP)

(72) Inventor: Shin Inami, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/962,644

(22) Filed: Dec. 8, 2015

(65) Prior Publication Data

US 2016/0167614 A1    Jun. 16, 2016

(30) Foreign Application Priority Data

Dec. 12, 2014 (JP) .................................. 2014-251364

(51) Int. Cl.

| | |
|---|---|
| *B60R 21/213* | (2011.01) |
| *B60R 21/214* | (2011.01) |
| *B60R 21/216* | (2011.01) |
| *B60R 21/232* | (2011.01) |
| *B60R 21/215* | (2011.01) |
| *B60R 13/02* | (2006.01) |

(52) U.S. Cl.
CPC .......... *B60R 21/213* (2013.01); *B60R 13/025* (2013.01); *B60R 13/0206* (2013.01); *B60R 13/0212* (2013.01); *B60R 21/214* (2013.01); *B60R 21/215* (2013.01); *B60R 21/216* (2013.01); *B60R 21/232* (2013.01); *B60R 2013/0293* (2013.01); *B60R 2021/2161* (2013.01); *B60R 2021/21506* (2013.01)

(58) Field of Classification Search
CPC ... B60R 21/213; B60R 21/214; B60R 21/215; B60R 21/216; B60R 21/232; B60R 13/0206; B60R 13/025; B60R 13/0212; B60R 13/02; B60R 2013/0293; B60R 2013/0281; B60R 2021/2161; B60R 2021/2163
USPC ........................ 280/730.2, 728.2; 296/193.06
See application file for complete search history.

(56) References Cited

U.S. PATENT DOCUMENTS

| | | | |
|---|---|---|---|
| 6,155,596 A * | 12/2000 | Nakajima | ............ B60R 21/213 280/730.2 |
| 6,431,584 B1 * | 8/2002 | Nagasawa | ........... B60R 13/0206 280/728.2 |

(Continued)

FOREIGN PATENT DOCUMENTS

| | | | | |
|---|---|---|---|---|
| CA | WO 2013032561 A1 | * | 3/2013 | ........... B60R 21/216 |
| JP | WO 2013035591 A1 | * | 3/2013 | ......... B60R 13/0206 |
| JP | 2014-37216 | | 2/2014 | |

*Primary Examiner* — Keith Frisby
(74) *Attorney, Agent, or Firm* — Greenblum & Bernstein, P.L.C.

(57) ABSTRACT

A roof headliner structure in which a curtain airbag for a vehicle is housed, includes the curtain airbag attached in a folded state along a roof side rail, a roof headliner, a pillar garnish including a clip seat, and a tether clip attached to the clip seat. The curtain airbag is covered from a vehicle cabin side with the roof headliner and the pillar garnish. The pillar garnish is attached to a pillar of the vehicle by the tether clip. The roof headliner has an extension portion extended so as to be positioned in the pillar garnish. The roof headliner is fitted at the extension portion to the clip seat.

4 Claims, 7 Drawing Sheets

(56) References Cited

U.S. PATENT DOCUMENTS

| | | | |
|---|---|---|---|
| 8,505,967 B2* | 8/2013 | Shamoto | B60R 21/213 |
| | | | 280/729 |
| 2007/0075531 A1* | 4/2007 | Tsuge | B60R 13/02 |
| | | | 280/730.2 |
| 2007/0126215 A1* | 6/2007 | Choi | B60R 21/213 |
| | | | 280/730.2 |
| 2011/0062683 A1* | 3/2011 | Schirm | B60R 21/216 |
| | | | 280/728.1 |
| 2013/0168515 A1* | 7/2013 | Yamamoto | B60R 13/0206 |
| | | | 248/231.81 |
| 2014/0159351 A1* | 6/2014 | Masatsugu | B60R 13/025 |
| | | | 280/728.2 |
| 2015/0130174 A1* | 5/2015 | Gillay | B60R 21/214 |
| | | | 280/743.2 |
| 2016/0068116 A1* | 3/2016 | Inagawa | B60R 21/213 |
| | | | 296/193.06 |
| 2016/0121836 A1* | 5/2016 | Yamamoto | F16B 19/1081 |
| | | | 280/728.2 |
| 2016/0375842 A1* | 12/2016 | Yamamoto | B60R 21/216 |
| | | | 24/289 |

* cited by examiner

ROOF HEADLINER STRUCTURE IN WHICH CURTAIN AIRBAG FOR VEHICLE IS HOUSED

INCORPORATION BY REFERENCE

The disclosure of Japanese Patent Application No. 2014-251364 filed on Dec. 12, 2014 including the specification, drawings and abstract is incorporated herein by reference in its entirety.

BACKGROUND OF THE INVENTION

1. Field of the Invention

The invention relates to a roof headliner structure in which a curtain airbag for a vehicle is housed.

2. Description of Related Art

Japanese Patent Application Publication No. 2014-037216 (JP 2014-037216 A) describes a technique for reducing the occurrence of breakage of an A-pillar garnish. Specifically, as illustrated in FIG. 5, a clip seat 4a is disposed on the opposite side of a curtain shield airbag (CSA) (hereinafter, simply referred to as "curtain airbag") 2 from the side on which the curtain airbag 2 deploys. A tilted portion 4b is formed at a junction between a front wall and a top wall of the clip seat 4a. The tilted portion 4b is tilted in such a direction that the seating surface of the clip seat 4a is reduced. This structure allows the clip seat 4a to easily pivot about an A-pillar inner panel 7 upon deployment of the curtain airbag 2. Thus, a held portion 5a of a tether clip 5 easily comes out of a through-hole 4c of the clip seat 4a. As a result, the occurrence of breakage of an A-pillar garnish 4 is reduced. According to JP 2014-037216 A, the curtain airbag 2 is housed not only in a roof headliner (ceiling material) but also in the A-pillar garnish 4.

FIG. 6 illustrates the flow of force during deployment of the curtain airbag 2. In other words, a force of deployment of the curtain airbag 2, which is generated by the gas from an inflator, is transmitted to the roof headliner through a route R2. In addition, the force of deployment of the curtain airbag 2 is transmitted directly to a terminal end of the A-pillar garnish 4 through a route R1. The force transmitted to the terminal end of the A-pillar garnish 4 is transmitted to the clip seat 4a of the A-pillar garnish 4 through a route R3, and serves as a force for detaching the tether clip 5 from the clip seat 4a (load required to remove the held portion 5a from the clip seat 4a).

However, the conventional structure has room for improvement regarding the following point. The roof headliner first opens toward the inside of a vehicle cabin, and then the curtain airbag 2 starts deploying with the A-pillar garnish 4 remaining. In this case, before the held portion 5a of the tether clip 5 is detached from the clip seat 4a, the force of deployment of the curtain airbag 2 may be applied directly to the A-pillar garnish 4, which may result in breakage (fracture) of the A-pillar garnish 4.

SUMMARY OF THE INVENTION

The invention provides a roof headliner structure in which a curtain airbag for a vehicle is housed, the roof headliner structure being configured to reduce the occurrence of breakage of a pillar garnish.

An aspect of the invention relates to a roof headliner structure in which a curtain airbag for a vehicle is housed. The roof headliner structure includes the curtain airbag attached in a folded state along a roof side rail, a roof headliner, a pillar garnish including a clip seat, and a tether clip attached to the clip seat. The curtain airbag is covered from a vehicle cabin side with the roof headliner and the pillar garnish. The pillar garnish is attached to a pillar of the vehicle by the tether clip. The roof headliner has an extension portion extended so as to be positioned in the pillar garnish. The roof headliner is fitted at the extension portion to the clip seat.

The roof headliner structure according to the above aspect of the invention produces the following advantageous effects. In the event of a boardside crash, an oblique crash, a small overlap (SOL) crash, or a rollover of the vehicle, the curtain airbag inflates and deploys. Along with the deployment of the curtain airbag, the roof headliner is pushed by the curtain airbag and thus opened toward the inside of a vehicle cabin. In the above aspect of the invention, the extension portion of the roof headliner is extended so as to be positioned in the pillar garnish and is fitted to the clip seat. Thus, a force of deployment of the curtain airbag is transmitted to the clip seat via the extension portion of the roof headliner, so that a held portion of the tether clip is promptly detached from the clip seat. Thus, at the time of deployment of the curtain airbag, the pillar garnish is opened more promptly than in the related art. This makes it possible to reduce occurrence of breakage of the pillar garnish.

The roof headliner structure according to the above aspect of the invention also produces the following advantageous effects. The extension portion of the roof headliner is extended so as to be positioned in the pillar garnish and is fitted to the clip seat.

Thus, the roof headliner can be reinforced using a load for detaching the tether clip from the clip seat. More specifically, when an end portion of the roof headliner in the vehicle-width direction is pushed by a force of deployment of the curtain airbag and moved toward the inside of the vehicle cabin, the movement of the roof headliner toward the inside of the vehicle cabin is reduced by an amount corresponding the load for detaching the tether clip from the clip seat (it becomes harder for the roof headliner to move toward the inside of the vehicle cabin) because the extension portion of the roof headliner is fitted to the clip seat. Thus, during deployment of the curtain airbag, the roof headliner pushes the curtain airbag toward the outside of the vehicle cabin, with a force that is greater than that in the related art. In this way, the direction of deployment of the curtain airbag is adjusted to the outward direction, so that the curtain airbag deploys along a side window. As a result, during deployment of the curtain airbag, the curtain airbag is less likely to get snagged on the pillar garnish. This makes it possible to effectively reduce the occurrence of breakage of the pillar garnish.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
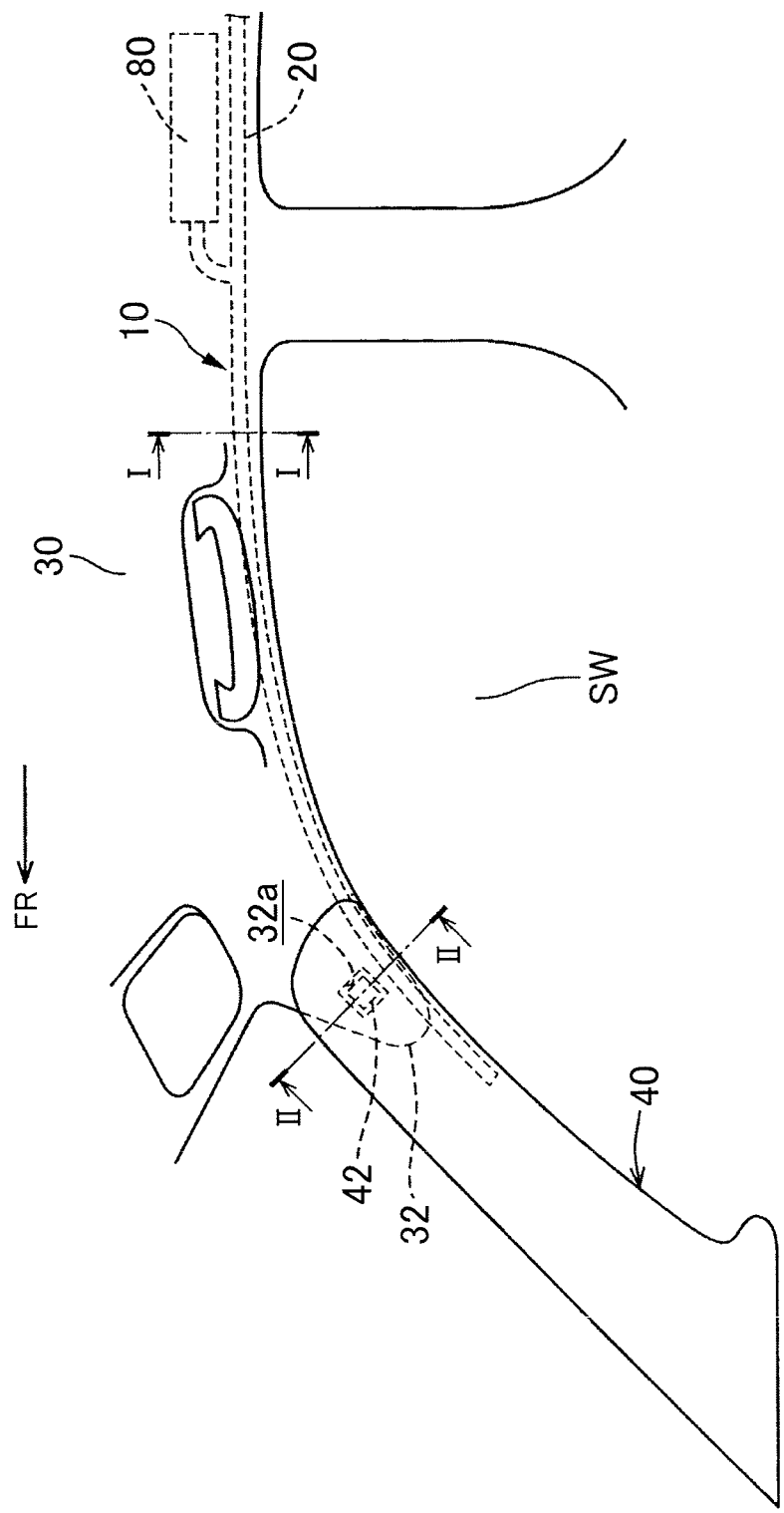
FIG. 1 is a perspective view of a roof headliner structure according to an embodiment of the invention.

Hereinafter, a roof headliner structure 10 in which a curtain airbag for a vehicle is housed, according to an embodiment of the invention, will be described with reference to the accompanying drawings. In the drawings, FR denotes the front side of a vehicle, UP denotes the upper side of the vehicle, and IN denotes the inner side in the vehicle-width direction. The roof headliner structure 10 is disposed on each of both the right and left sides of the vehicle. The roof headliner structure 10 on the right side and the roof headliner structure 10 on the left side are symmetrically shaped.

As illustrated in FIG. 1, the roof headliner structure 10 includes a curtain shield airbag (CSA) (hereinafter, simply referred to as "curtain airbag") 20, a roof headliner 30, an A-pillar garnish 40, and a tether clip 50 (see FIG. 3).

Figure 2:
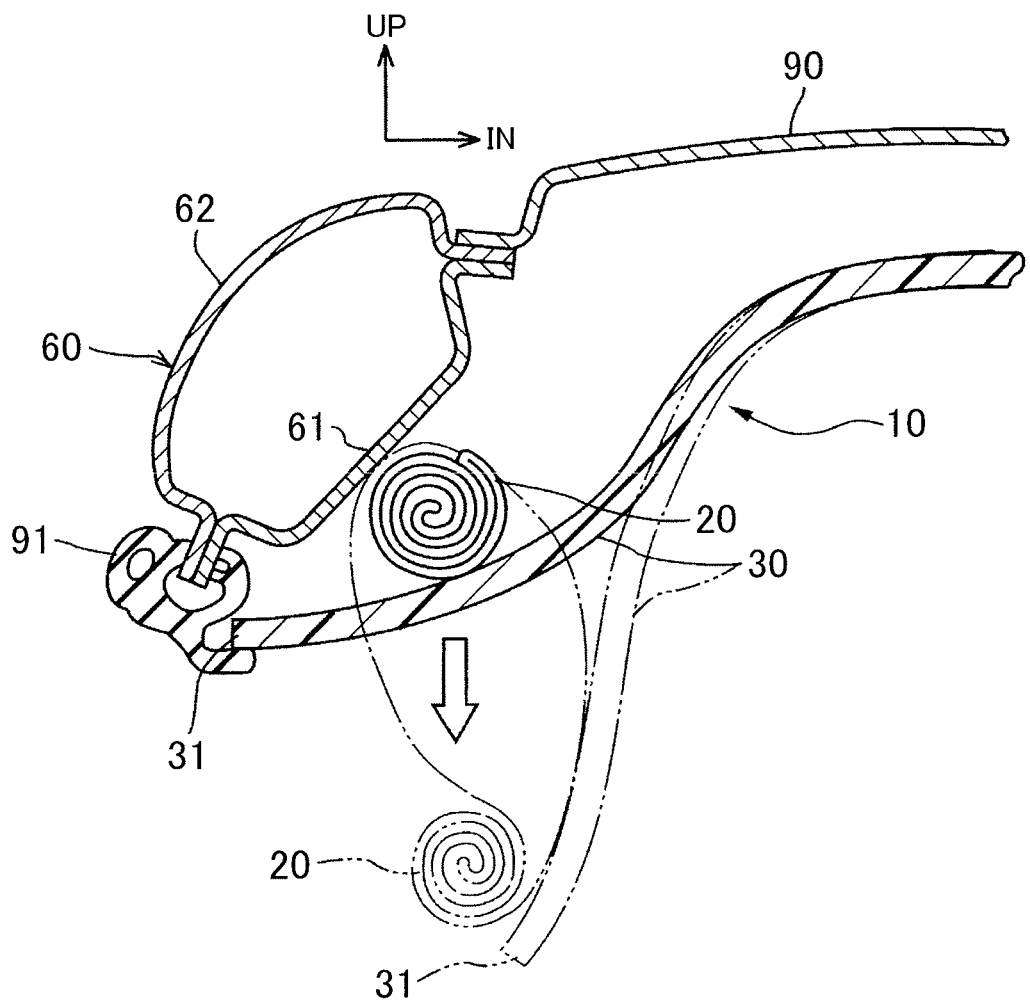
FIG. 2 is an enlarged cross-sectional view taken along the line I-I in FIG. 1.

As illustrated in FIG. 2, the curtain airbag 20 is disposed in a folded state in a space between the roof headliner 30 and a roof side rail 60. As illustrated in FIG. 3, a front end portion of the curtain airbag 20 in the vehicle front-rear direction is interposed between the A-pillar garnish 40 and a vehicle pillar (A-pillar) 70 to which the A-pillar garnish 40 is attached. In other words, as illustrated in FIG. 1, the curtain airbag 20 in a folded state is covered from the vehicle cabin side with the roof headliner 30 and the A-pillar garnish 40. The curtain airbag 20 is attached in a folded state along the roof side rail 60. The curtain airbag 20 may be folded by either roll-folding or bellows-folding. The curtain airbag 20 inflates and deploys upon reception of a supply of gas for inflation from an inflator 80 connected to the curtain airbag 20. As illustrated in FIG. 2 and FIG. 3, the curtain airbag 20 pushes an end portion 31 of the roof headliner 30 in the vehicle-width direction, downward to open the end portion 31, and also opens the A-pillar garnish 40, and then the curtain airbag 20 deploys between the lateral side of the vehicle cabin and an occupant to protect the head of the occupant.

The roof headliner 30 is a ceiling material. The roof headliner 30 includes a single layer or multilayers of relatively-soft synthetic resin material, including, for example, a foamed resin material or a non-woven upholstery material. As illustrated in FIG. 2, the roof headliner 30 covers a roof panel 90 and the roof side rail 60 from below with a space left therebetween. The end portion 31 of the roof headliner 30 in the vehicle-width direction is hooked on a weather strip 91 attached to the roof side rail 60.

The A-pillar garnish (front pillar garnish) 40 extends in the longitudinal direction of the A-pillar (front pillar) 70. As illustrated in FIG. 3, the A-pillar garnish 40 includes a main portion 41 and a clip seat 42 formed on the back surface of the main portion 41. An end portion 41a of the main portion 41, the end portion 41a being located close to a side window SW of the vehicle, is hooked on a weather strip 92 attached to the A-pillar 70. The clip seat 42 is disposed at an upper end portion (and the vicinity thereof) of the main portion 41. A top wall 42a of the clip seat 42 has a through-hole 42b through which the tether clip 50 is passed. The A-pillar garnish 40 is attached to the A-pillar 70 using the tether clip 50 attached to the clip seat 42.

The tether clip 50 is made of a resin material having elasticity. The tether clip 50 has a body attachment portion (locking lug) 51, a tether portion 52, an anchor portion 53, a held portion 54, and a flange portion (seat portion) 55.

The tether clip 50 is attached at the body attachment portion 51 to the A-pillar 70. The anchor portion 53 is disposed at one end portion of the tether portion 52 in its longitudinal direction, and the flange portion 55 is disposed at the other end portion of the tether portion 52 in its longitudinal direction. The held portion 54 is located at the tether portion 52 or the flange portion 55, and is elastically deformable.

In a normal state where the curtain airbag 20 does not deploy, the held portion 54 is engaged with a peripheral portion around the through-hole 42b of the clip seat 42, and the top wall 42a of the clip seat 42 is held between the held portion 54 and the flange portion 55. During deployment of the curtain airbag 20, a detachment load is applied to the held portion 54, which makes the held portion 54 elastically deform and come out of the through-hole 42b. As a result, the A-pillar garnish 40 opens partway in a direction away from the A-pillar 70, and the anchor portion 53 is engaged with the peripheral portion around the through-hole 42b. Thus, the A-pillar garnish 40 is prevented from flying apart. Through a gap between the end portion 41a of the A-pillar garnish 40 and the A-pillar 70 in the state where the A-pillar garnish 40 opens partway, the curtain airbag 20 deploys into the vehicle cabin.

As illustrated in FIG. 2, the roof side rail 60 has a closed cross-section formed by welding flanges of an inner panel 61 and flanges of an outer panel 62 together. The roof side rail 60 may include a reinforcement (not illustrated) disposed between the inner panel 61 and the outer panel 62. As illustrated in FIG. 3, the A-pillar 70 includes an inner panel 71, a reinforcement 72, and an outer panel 73.

In the embodiment of the invention, as illustrated in FIG. 1, the roof headliner 30 has an extension portion 32 extended so as to be positioned in the A-pillar garnish 40. The roof headliner 30 is fitted at the extension portion 32 to the clip seat 42.

The extension portion 32 is formed so as to be integral with the roof headliner 30 (i.e., the extension portion 32 is an integral part of the roof headliner 30). The extension portion 32 is formed at each of both the right and left terminal end portions of the roof headliner 30. The extension portion 32 extends toward the front of the vehicle and downward, and extends in a space between the A-pillar garnish 40 and the A-pillar 70. Thus, in a normal state where the curtain airbag 20 does not deploy, the extension portion 32 is covered from the vehicle cabin side with the A-pillar garnish 40, and thus cannot be seen by an occupant in the vehicle cabin. As illustrated in FIG. 3, the extension portion 32 is located closer to the vehicle cabin than the curtain airbag 20 located in the A-pillar garnish 40 is (i.e., the extension portion 32 is located inward of the curtain airbag 20 in the vehicle-width direction). The extension portion 32 is disposed along (in contact with) the back surface of the main portion 41 of the A-pillar garnish 40.

The extension portion 32 has a fitting portion 32a to which the clip seat 42 is fitted (engaged). The fitting portion 32a may be, for example, a fitting hole formed in the extension portion 32. However, the fitting portion 32a need not be a fitting hole, as long as the clip seat 42 can be fitted to the fitting portion 32a. When the fitting portion 32a is a fitting hole, the clip seat 42 is passed through the fitting portion 32a, so that the clip seat 42 is surrounded by the extension portion 32.

Next, the operation and advantageous effects of the embodiment of the invention will be described. In the event of a boardside crash, an oblique crash, a small overlap (SOL) crash, or a rollover of the vehicle, the curtain airbag 20 is supplied with gas from the inflator 80 and thus inflates and deploys. Along with the deployment of the curtain airbag 20, as illustrated in FIG. 2, the end portion 31 of the roof headliner 30 in the vehicle-width direction is directly pushed by the curtain airbag 20 and thus deployed toward the inside of the vehicle cabin.

Figure 4:
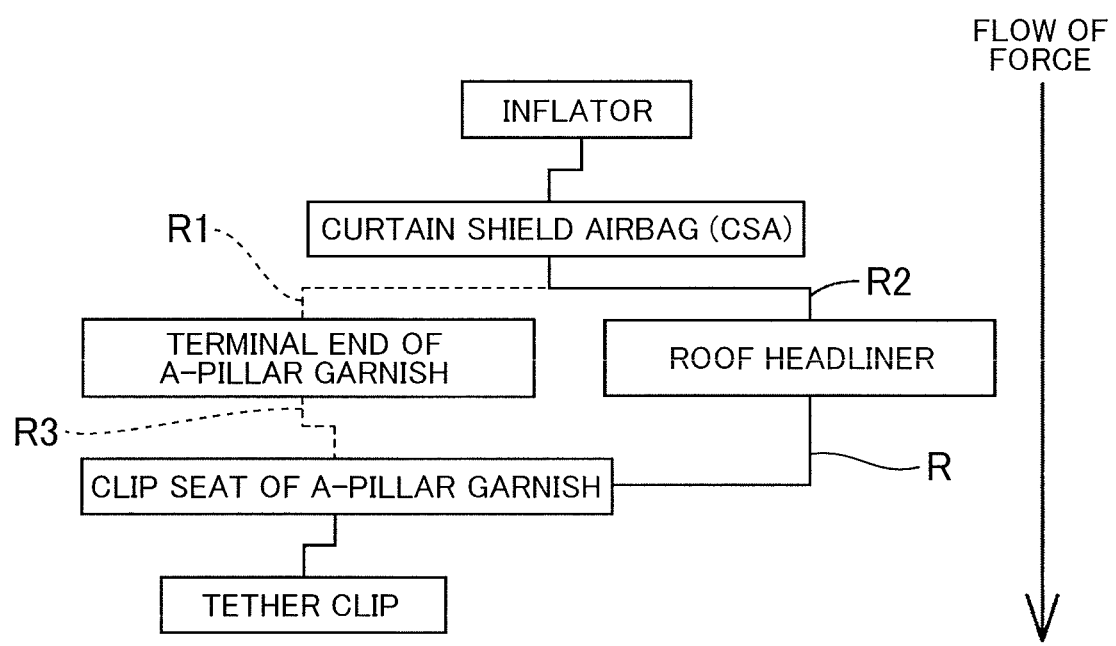
FIG. 4 is a route diagram illustrating a route along which a force of deployment of a curtain airbag is transmitted in the roof headliner structure according to the embodiment of the invention.
Figure 5:
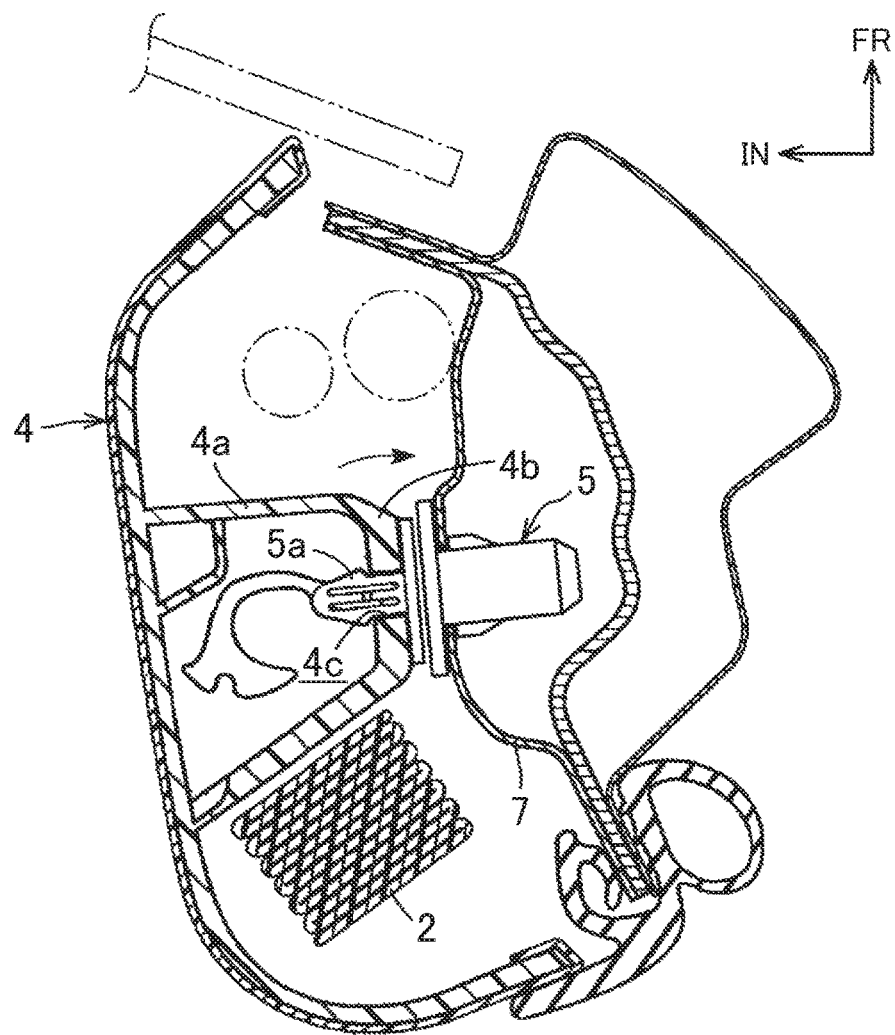
FIG. 5 is a cross-sectional view of a conventional roof headliner structure.
Figure 6:
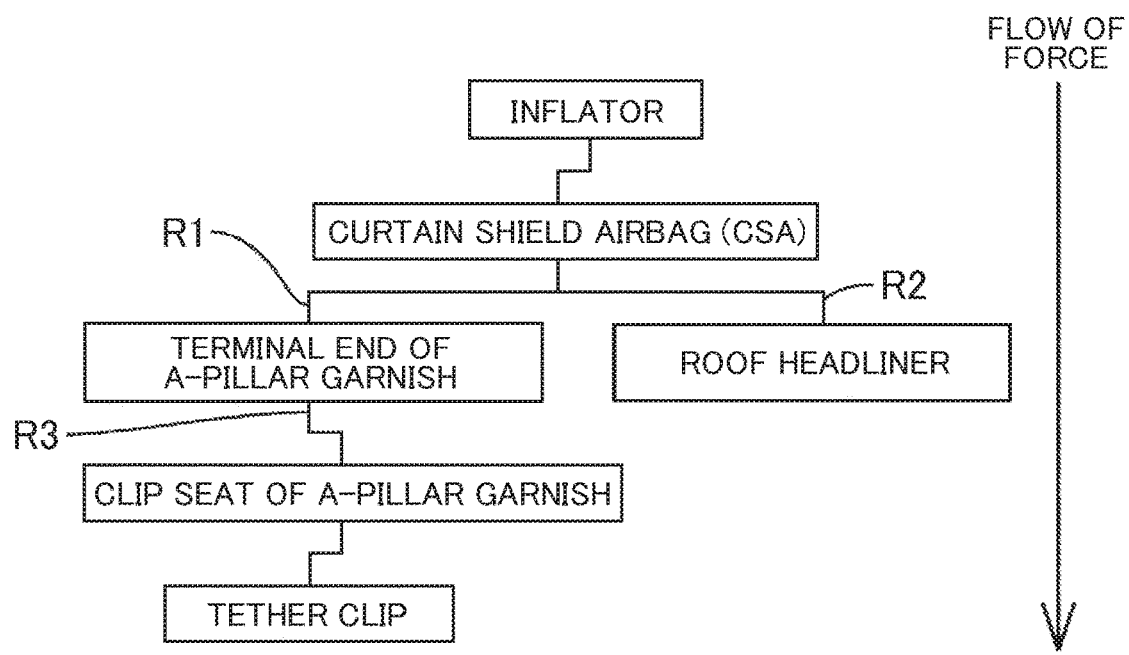
FIG. 6 is a route diagram illustrating a route along which a force of deployment of a curtain airbag is transmitted in the conventional roof headliner structure.

In the embodiment of the invention, as illustrated in FIG. 1, the extension portion 32 of the roof headliner 30 is extended so as to be positioned inside the A-pillar garnish 40 and is fitted to the clip seat 42. Thus, the clip seat 42 is pulled by the roof headliner 30 that deforms earlier than the terminal end of the pillar garnish 40, and a force of the deployment of the curtain airbag 20 is transmitted to the clip seat 42 via the extension portion 32 of the roof headliner 30. That is, as illustrated in FIG. 4, a route R along which the force of the deployment of the curtain airbag 20 is directly transmitted from the roof headliner 30 to the clip seat 42 is established. The force of the deployment of the curtain airbag 20 is transmitted to the clip seat 42 via the terminal end of the A-pillar garnish 40 through a route R1 and a route R3, and also transmitted to the clip seat 42 via the roof headliner 30 through a route R2 and the route R. The load transmitted through the routes R2, R reaches the clip seat 42 earlier than the load transmitted through the routes R1, R3. Through the routes R2, R, the load is transmitted from the curtain airbag 20 to the clip seat 42 via the roof headliner 30. Through the routes R1, R3, the load is transmitted from the curtain airbag 20 to the clip seat 42 via the terminal end of the pillar garnish 40. This makes it possible to input the load into the tether clip 50 more promptly, while reducing the burden on the terminal end of the pillar garnish 40.

Figure 3:
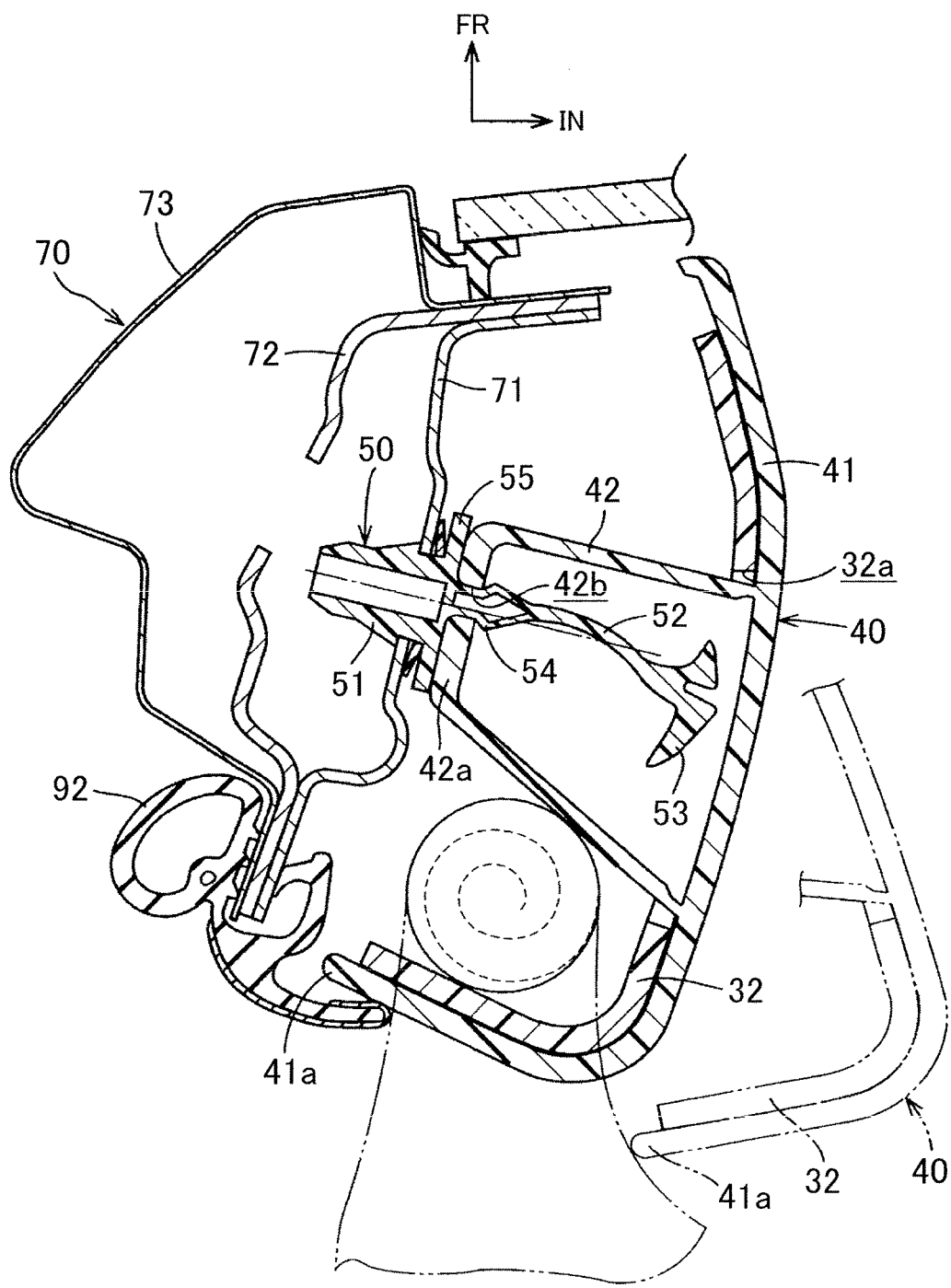
FIG. 3 is an enlarged cross-sectional view taken along the line II-II in FIG. 1.

Thus, as illustrated in FIG. 3, the held portion 54 of the tether clip 50 is promptly detached from the clip seat 42, and an opening through which the curtain airbag 20 is deployed is formed between the A-pillar garnish 40 and the A-pillar 70. Thus, at the time of deployment of the curtain airbag 20, the A-pillar garnish 40 is opened more promptly than in the related art. This makes it possible to avoid the situation where the curtain airbag 20 gets snagged on the A-pillar garnish 40 during deployment of the curtain airbag 20 and the A-pillar garnish 40 breaks.

As illustrated in FIG. 1, the extension portion 32 of the roof headliner 30 is extended so as to be positioned in the A-pillar garnish 40 and is fitted to the clip seat 42. Thus, the roof headliner 30 can be reinforced using a load for detaching the tether clip 50 from the clip seat 42. More specifically, when the end portion 31 of the roof headliner 30 in the vehicle-width direction is pushed by a force of deployment of the curtain airbag 20 and moved toward the inside of the vehicle cabin, the movement of the roof headliner 30 toward the inside of the vehicle cabin is reduced by an amount corresponding the load for detaching the tether clip 50 from the clip seat 42 (it becomes harder for the roof headliner 30 to move toward the inside of the vehicle cabin) because the extension portion 32 of the roof headliner 30 is fitted to the clip seat 42. Thus, during deployment of the curtain airbag 20, the roof headliner 30 pushes the curtain airbag 20 toward the outside of the vehicle cabin, with a force that is greater than that in the related art. In this way, the direction of deployment of the curtain airbag 20 is adjusted to the outward direction, so that the curtain, airbag 20 deploys along the side window SW. As a result, during deployment of the curtain airbag 20, the curtain airbag 20 is less likely to get snagged on the A-pillar garnish 40. This makes it possible to reduce the occurrence of breakage of the A-pillar garnish 40.

As illustrated in FIG. 4, the route R along which the force of the deployment of the curtain airbag 20 is directly transmitted from the roof headliner 30 to the clip seat 42 is established. This allows elimination of the routes RI, R3 along which the force of deployment of the curtain airbag 20 is transmitted from the curtain airbag 20 to the clip seat 42 via the terminal end of the A-pillar garnish 40. Thus, it is possible to obtain advantageous effects such as enhancement in flexibility in the shape of the curtain airbag 20.

As illustrated in FIG. 1, in a normal state where the curtain airbag 20 does not deploy, the extension portion 32 is covered from the vehicle cabin side with the A-pillar garnish 40, and thus cannot be seen by an occupant in the vehicle cabin. Thus, deterioration in design of the vehicle cabin due to provision of the extension portion 32 is prevented.

According to the foregoing embodiment, just providing the roof headliner 30 with the extension portion 32 is required to reduce the occurrence of breakage of the A-pillar garnish 40. Thus, the cost efficiency is higher than that in the following cases where i) the stiffness of the roof headliner 30 is enhanced by, for example, changing the material of the roof headliner 30, ii) the shape or material of the A-pillar garnish 40 is changed, and iii) a reinforcement tape for reinforcing the A-pillar garnish 40 is provided.

While the pillar garnish 40 is an A-pillar garnish and the pillar 70 is an A-pillar in the foregoing embodiment, the pillar garnish 40 may be a C-pillar garnish or a D-pillar garnish (rear pillar garnish), and the pillar 70 may be a C-pillar or a D-pillar (rear pillar). Further, the pillar garnish 40 may be a B-pillar garnish (center pillar garnish), and the pillar 70 may be a B-pillar (center pillar).

Figure 7:
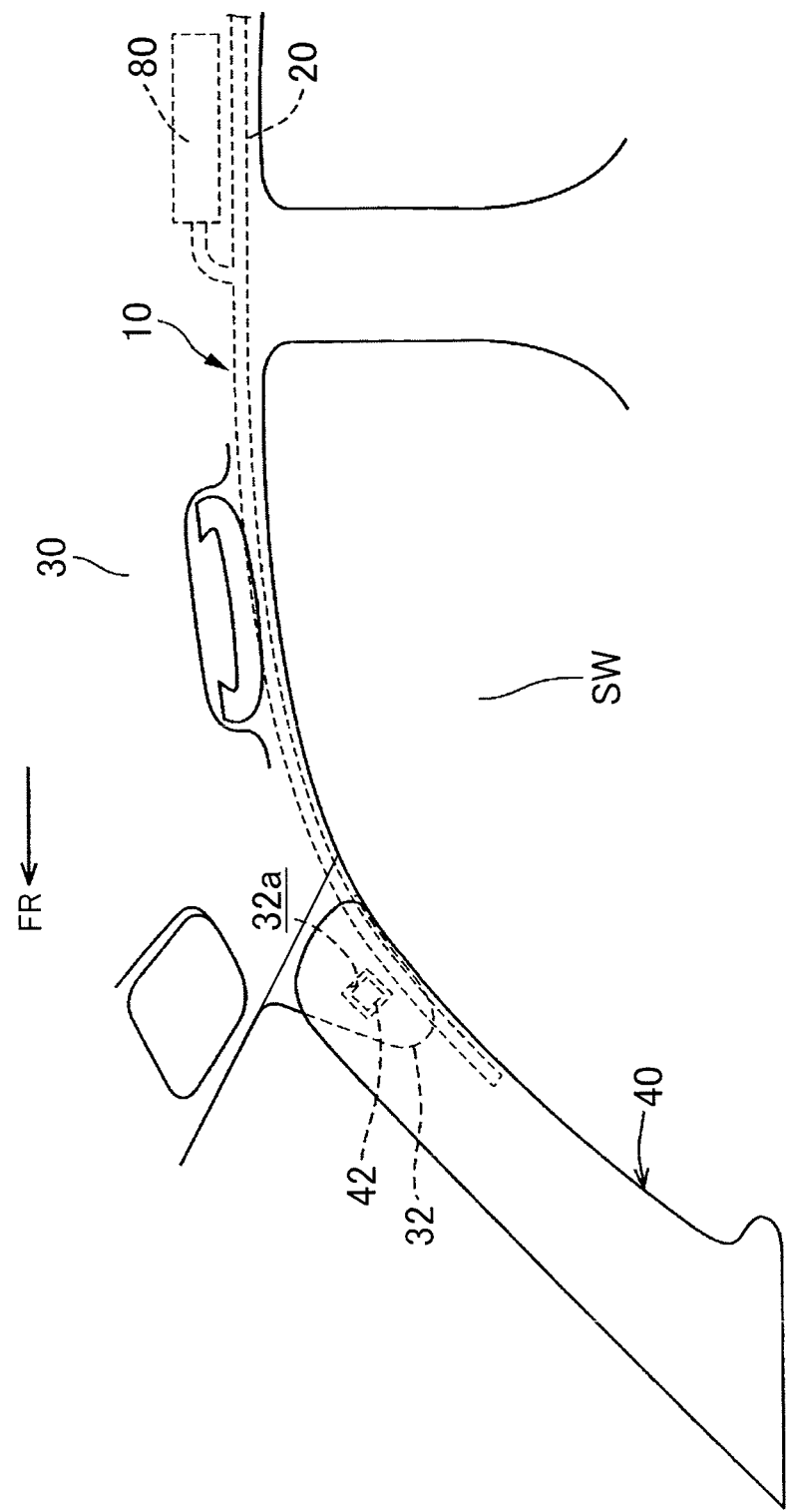
FIG. 7 is a perspective view of a roof headliner structure according to another embodiment of the invention.

In the foregoing embodiment, the extension portion 32 is formed so as to be integral with the roof headliner 30 (i.e., the extension portion 32 is an integral part of the roof headliner 30). In this case, the number of steps for forming the roof headliner 30 and the extension portion 32 is small. However, the yield rate of the ceiling material may deteriorate. In view of this, a roof headliner 30 having a conventional shape and an extension portion 32 that is a member different from the roof headliner 30 may be prepared, and the extension portion 32 may be secured to the roof headliner 30, as illustrated in FIG. 7. More specifically, the extension portion 32 may be formed of a sheet member that is prepared separately from the roof headliner 30, and the extension portion 32 may be joined to the roof headliner 30 by, for example, a staple gun, sewing, thermal welding, or an adhesive agent. In this case, the extension portion 32 is formed of, for example, a hard sheet, a vinyl chloride sheet, or a resin molded material. This structure makes it possible to prevent deterioration of the yield rate of the ceiling material.

What is claimed is:

1. A roof headliner structure in which a curtain airbag for a vehicle is housed, the roof headliner structure comprising:
   the curtain airbag attached in a folded state along a roof side rail;
   a roof headliner;
   a pillar garnish including a clip seat; and a tether clip attached to the clip seat, the curtain airbag being covered from a vehicle cabin side with the roof headliner and the pillar garnish, the pillar garnish being attached to a pillar of the vehicle by the tether clip, the roof headliner having an extension portion extended so as to be positioned in the pillar garnish, and the roof headliner being fitted at the extension portion to the clip seat.

2. The roof headliner structure according to claim 1, wherein the extension portion is an integral part of the roof headliner.

3. The roof headliner structure according to claim 1, wherein:

the extension portion is a member different from the roof headliner; and the extension portion is joined to the roof headliner.

4. The roof headliner structure according to claim 1, wherein the extension portion has a fitting hole; and the clip seat is passed through the fitting hole.

\* \* \* \* \*